(12) United States Patent
Kinoshita et al.

(10) Patent No.: US 6,176,799 B1
(45) Date of Patent: Jan. 23, 2001

(54) V-RIBBED POWER TRANSMISSION BELT

(75) Inventors: Takashi Kinoshita, Takasago; Hitoshi Hasaka; Toshimi Kumazaki, both of Kobe, all of (JP)

(73) Assignee: Mitsuboshi Belting Ltd., Kobe (JP)

( * ) Notice: Under 35 U.S.C. 154(b), the term of this patent shall be extended for 0 days.

(21) Appl. No.: 08/828,666

(22) Filed: Mar. 31, 1997

(30) Foreign Application Priority Data

Apr. 2, 1996 (JP) .................................................. 8-106302

(51) Int. Cl.[7] ...................................................... F16G 1/00
(52) U.S. Cl. ........................ 474/237; 474/238; 474/260; 428/337
(58) Field of Search .................................. 474/237, 249, 474/250, 259, 260, 261, 263, 264, 265, 268, 271, 273; 428/337; 28/1.4; 15/256.5

(56) References Cited

U.S. PATENT DOCUMENTS

| | | | |
|---|---|---|---|
| 4,577,362 | * 3/1986 | Tanaka et al. | ........................ 15/256.5 |
| 4,812,360 | * 3/1989 | Utsumi | ................................. 428/337 |
| 4,904,232 | * 2/1990 | Kitahama et al. | ..................... 474/238 |
| 5,037,360 | * 8/1991 | Fujiwara et al. | .................. 474/238 X |
| 5,116,286 | * 5/1992 | Kinoshita et al. | ..................... 474/237 |
| 5,387,160 | * 2/1995 | Nakajima et al. | ............... 474/260 X |
| 5,413,538 | * 5/1995 | Mishima | ........................... 474/268 X |
| 5,536,214 | * 7/1996 | Akita et al. | ............................ 474/268 |

* cited by examiner

*Primary Examiner*—Thomas R. Hannon
*Assistant Examiner*—Marcus Charles
(74) *Attorney, Agent, or Firm*—Wood, Phillips, VanSanten, Clark & Mortimer

(57) ABSTRACT

A power transmission belt having a body with a length, an inside, an outside, laterally spaced sides, and at least one rib. The body has a compression section, a tension section, and a load carrying element between the inside and outside of the body and extending in a lengthwise direction. The load carrying element is made from twisted polyester fiber filaments having an ethylene-2,6-naphthalate component and a denier of 4,000–8,000. The belt requires a stress of at least 500 N per rib to effect elongation of the belt by 3%. The belt has a dry heat shrinkage stress between 100 N and 200 N after an initial load of 147 N is applied to the belt and the belt is allowed to reside in an atmosphere at a temperature of 100° C. for 30 minutes.

13 Claims, 1 Drawing Sheet

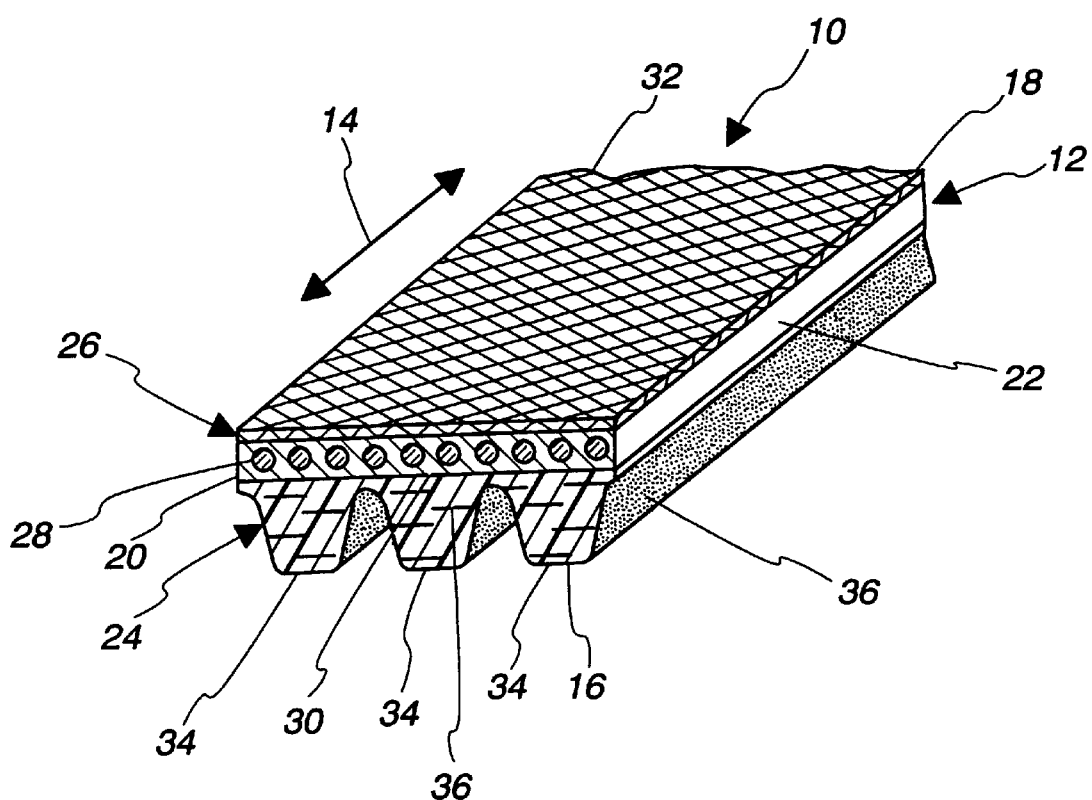

V-RIBBED POWER TRANSMISSION BELT

BACKGROUND OF THE INVENTION

1. Field of the Invention

This invention relates to power transmission belts and, more particularly, to a V-ribbed power transmission belt with a controlled belt slip ratio.

2. Background Art

A conventional V-ribbed belt has a body with an inside and an outside and load carrying members embedded in a cushion rubber layer. A canvas cover is applied on a surface outwardly of the cushion rubber layer, with a plurality of laterally spaced ribs defined on the body inside of the cushion rubber layer. This belt construction has been widely used to drive automobile accessories, such as air compressors, alternators, and the like. For this type of belt to efficiently transmit power to and from cooperating components, it is important to have a relatively low slip ratio between the belt and a cooperating pulley. The belt slip ratio can be decreased by increasing the tension on the belt.

By increasing the tension on the belt, the dry heat shrinkage stress of the belt is increased. However, the dry heat shrinkage ratio and the shrinkage of the belt length over time increase.

SUMMARY OF THE INVENTION

The present invention has as an objective the ability to address the above problems and provide a V-ribbed belt with a relatively low belt slip ratio and one which has a good life expectancy.

In one form of the invention, a power transmission belt is provided having a body with a length, an inside, an outside, laterally spaced sides, and at least one rib. The body has a compression section, a tension section, and a load carrying element between the inside and outside of the body and extending in a lengthwise direction. The load carrying member is made from twisted polyester fiber filaments having an ethylene-2,6-naphthalate component and a denier of 4,000–8,000. The belt requires a stress of at least 500 N per rib to effect elongation of the belt by 3%. The belt has a dry heat shrinkage stress between 100 N and 200 N after an initial load of 147 N is applied to the belt and the belt is allowed to reside in an atmosphere at a temperature of 100° C. for 30 minutes.

In one form, the body has a plurality of laterally spaced ribs on at least one of the inside and outside thereof.

The body may have a cushion rubber layer in which the load carrying element is embedded.

In one form, the ribs are defined in the compression section by at least one of hydrogenated nitrile rubber with a hydrogenation rate of at least 80%, chloroprene rubber, natural rubber, chlorosulfonated polyethylene rubber (CSM), alkylated chlorosulfonated polyethylene (ACSM), and styrene-butadiene rubber (SBR).

Reinforcing fibers may be embedded in rubber in the compression section.

These fibers may be at least one of nylon 6, nylon 66, polyester, cotton, and aramid, with a length between 1 and 20 mm and may be present in an amount of 1–30 parts by weight per 100 parts by weight of rubber.

The fibers may be adhesive treated with at least one of an epoxy compound and isocyanate compound.

The load carrying element may be a cord with filaments that are upper twisted between 10 and 23 times per 10 cm and lower twisted between 17 and 38 times per 10 cm.

In one form, the ethylene-2,6-naphthalate is formed by polycondensing at least one of naphthalene-2,6-dicarboxylic acid and its ester-forming derivative in the presence of a catalyst.

The load carrying element may be treated with at least one of an epoxy compound and an isocyanate compound.

After treating the load carrying element with at least one of an epoxy compound and an isocyanate compound, the load carrying element may be dried and treated with an RFL solution.

After treatment with the RFL solution, the load carrying element may be drawn from 1 to 3%.

A canvas layer may be provided on one of the inside and outside of the body.

The invention also contemplates a method of forming a power transmission belt, which method includes the steps of: twisting a plurality of polyester fiber filaments having an ethylene-2,6-naphthalate component together to define a load carrying cord having a denier of 4,000–8,000; treating the load carrying cord with at least one of an epoxy compound, an isocyanate compound, and an RFL solution; drawing the cord after treating the cord in a controlled temperature environment; embedding the cord into a body; and forming the body to define a power transmission belt having at least one rib. The treating and drawing steps are controlled so that (a) a stress of at least 500 N per rib is required to effect elongation of the belt by 3% and (b) the belt has a dry heat shrinkage stress between 100 N and 200 N after an initial load of 147 N is applied to the belt and the belt is allowed to reside in an atmosphere at a temperature of at least 100° C. for 30 minutes.

The drawing step may involve drawing the cord to between 1 and 3% at a temperature from 210° to 260° C. for 30 to 600 seconds.

The step of treating the load carrying cord may involve the steps of pre-treating the load carrying cord with at least one of an epoxy compound and an isocyanate compound, drying the at least one of the epoxy compound and the isocyanate compound, and thereafter treating the load carrying cord with an adhesive having an RFL solution.

The step of drying the at least one of the epoxy compound and the isocyanate compound may include the step of drying the at least one of the epoxy compound and the isocyanate compound at a temperature of 160 to 200° C. for 30 to 600 seconds.

The drawing step may involve drawing the cord from 1 to 3% with the cord maintained in an atmosphere at a temperature of 210° to 260° C. for 30 to 600 seconds.

The process may further include forming multiple ribs on the body.

The method may still further include the steps of embedding reinforcing fibers in the body and applying a canvas layer to the body.

BRIEF DESCRIPTION OF THE DRAWINGS

FIG. 1 is a fragmentary, perspective view of a V-ribbed belt according to the present invention.

DETAILED DESCRIPTION OF THE DRAWINGS

In FIG. 1, a V-ribbed belt, according to the present invention, is shown at 10. The belt 10 has a body 12 with a length in the direction of the double-headed arrow 14, an inside surface 16, an outside surface 18, and laterally spaced sides 20, 22. The body 12 has a compression section 24, a tension section 26, and load carrying elements/cords 28 between the compression and tension sections 24, 26 and defining a neutral axis. The load carrying elements/cords 28 are embedded in a cushion rubber layer 30. A canvas layer 32 is adhered to the outside surface 18. On the inside of the belt 10, a plurality, and in this case three, ribs 34 are formed, with each rib 34 in cross section having a triangular, trapezoidal shape.

The ribs 34 are made from a rubber that is at least one of hydrogenated nitrile butadiene rubber, chloroprene rubber, natural rubber, chlorosulfonated polyethylene rubber (CSM), alkylated chlorosulfonated polyethylene (ACSM), and styrene-butadiene rubber (SBR). In the event that hydrogenated nitrile butadiene rubber is used, it preferably has a hydrogenation rate of at least 80% and more preferably at least 90% to exhibit good heat and ozone resistance. With a hydrogenation rate of less than 80%, resistance to heat and ozone are significantly reduced. For good resistance to oil and low temperature, an acrylonitrile is bonded preferably in the range of 20% to 45%.

Laterally extending, short fibers 36 are embedded in the ribs 34. The fibers 36 may be at least one of nylon 6, nylon 66, polyester, cotton, or aramid. These fibers 36 give lateral stability to the belt body 12. In a preferred form, the fibers 36 protrude from the sides 20, 22 of the body 12 to define an effectively enlarged surface contact area with a cooperating pulley (not shown), to thereby decrease the coefficient of friction between the belt 10 and a cooperating pulley so as to reduce operating noise. Preferably, aramid fibers are used for the fibers 36 alone or in combination with other fibers. The aramid fibers are desirable for their strength and wear resistance. The fibers 36 preferably have a length between 1 and 20 mm and are present in an amount of 1–30 parts by weight per 100 parts by weight of rubber.

Aramid fibers having an aromatic ring are preferred. Fibers suitable for incorporation into the belt 10 are commercially available and sold by DuPont under the trademark KEVLAR™, Teijin Ltd. under the name CONEX™, DuPont under the trademark NOMEX™, Teijin Ltd. under the trademark TECHNORA™, and Anka of Holland under the trademark TWARON™. These are only examples of suitable commercially available fibers.

It has been found that when the amount of aramid fiber is less than 1 part by weight, the exposed surfaces of the ribs 34 become sticky and wear out prematurely. When the fibers 36 exceed 30 parts by weight, dispersion of the fibers 36 in the rubber is generally not uniform.

To improve the adhesion between the fibers 36 and the rubber in the ribs 34, the fibers 36 are subjected to an adhesive treatment with a treating solution that is at least one of an epoxy compound and an isocyanate compound.

The load carrying cords 28 are formed by twisting a group of polyester fiber filaments with ethylene-2,6-naphthalate as the main structural unit thereof to form a yarn having a total denier of from 4,000 to 8,000. The cords 28 are upper twisted between 10–23 times per 10 cm and lower twisted between 17 and 38 times per 10 cm.

It has been found that when the total denier is less than 4,000 the modulus and strength of the load carrying cord 28 are unacceptably lowered. When the denier exceeds 8,000, the belt thickness increases and flexing characteristics are compromised.

Ethylene-2,6-naphthalate is formed by polycondensing naphthalene-2,6-dicarboxylic acid or its ester-forming derivative in the presence of a catalyst. When one or more compounds are added as a third component before polymerization of ethylene 2,6-naphthalate is complete, a copolyester is formed.

The load carrying cord 28 is adhesive treated by first dipping the untreated cord into a tank filled with a treating solution that is at least one of an epoxy compound and an isocyanate compound. The treated cord 28 is then dried by being passed through an oven at a temperature of 160° to 260° C. for from 30 to 600 seconds. The dried cord 28 is then dipped into a tank filled with an adhesive with an RFL solution component. The resulting cord 28 is drawn to from 1–3% by being passed through a drawing/heat setting machine, with the cord 28 being held at a temperature from 210° to 260° C. from 30 to 600 seconds.

The epoxy compound may be a reaction product of a polyhydric alcohol such as ethylene glycol, glycerol or pentaerythritol, or a polyalkylene glycol such as polyethylene glycol and a halogen-containing epoxy compound such as epichlorohydrin, with a reaction product of a polyhydric phenol such as resorcinol, bis(4-hydroxyphenyl) dimethylmethane, a phenol-formaldehyde resin, or a resorcinol-formaldehyde resin and a halogen-containing epoxy compound. The epoxy compound is mixed with an organic solvent such as toluene, methyl ethyl ketone, or the like.

The isocyanate compound may be at least one of 4,4'-diphenylmethane diisocyanate, toluene 2,4-diisocyanate, p-phenyl diisocyanate, and polyallyl polyisocyanate. This isocyanate compound is mixed with an organic solvent such as toluene, methyl ethyl ketone, or the like.

The RFL solution may be obtained by mixing an initial condensate of resorcinol and formalin with a latex. Suitable latexes are chloroprene, a styrene-butadiene-vinylpyridine three-component copolymer, hydrogenated nitrile butadiene rubber, nitrile-butadiene rubber (NBR), and the like.

The load carrying cord 28, after it is drawn and heat set, can be combined with the above described layers to produce a belt having a high modulus by setting the spinning pitch, namely the winding pitch of the tension member, at from 1.0 to 1.3 mm. When the pitch is less than 1.0 mm, the load carrying cord 28 is mounted onto an adjacent cord and take-up of the cord is not possible. On the other hand, as the pitch exceeds 1.3 mm, the modulus of the belt is gradually decreased.

The canvas layer 32 may be obtained by weaving yarns made of cotton, polyamide, polyethylene, terephthalate, or aramid fibers into a plain weave, twill weave, or satin weave fabric.

A stress of 500 N/rib is required to extend the belt by 3%. A dry heat shrinkage stress of between 100 and 200 N occurs after an initial load of 147 N is applied to the belt with the belt in an atmosphere at a temperature of 100° C. for 30 minutes. When the 3% modulus is less than 500 N per rib, or the dry heat shrinkage stress of the belt 10 is less than 100 N, the belt tends to elongate easily, to thereby significantly decrease the tension of the belt and increase the slip ratio. When the dry heat shrinkage stress of the belt exceeds 200 N, there is a tendency of the belt to shrink over time. When the dry heat shrinkage stress of the belt exceeds 200 N, there is generally insufficient effect in decreasing the slip ratio.

When aramid fibers are used, the modulus of the belt can be increased, however, there is little heat shrinkage, thereby requiring an auto tensioner. As a result, the overall system to which the belt is incorporated becomes more complicated. However, load carrying cords formed with polyester fibers containing ethylene-2,6-naphthalate as a main structural unit causes considerable heat shrinkage, obviating the need to use an auto tensioner.

The operation of the inventive belt will now be demonstrated by comparative testing.

Inventive Belt No. 1 and Comparative Samples Nos. 1–4

A load carrying cord was prepared using an untreated cord with a total denier of 6,000 to 6,600. The cord was formed by twisting ethylene-2,6-naphthalate (PEN) fibers of 1,000 denier and polyethylene terephthalate (PET) fibers with a denier of 1,000–1,100 in a twist structure of 2×3 with an upper twist coefficient of 3.0 and a lower twist coefficient of 3.0. Properties of the various cords are shown in Table 1, below.

TABLE 1

| Sample No. | Polyester Type | Denier [d] | Strength [g,d] | Dry heat shrinkage ratio (%) |
|---|---|---|---|---|
| 1 | PEN | 6,000 | 7.5 | 2.5 |
| 2 | PET | 6,600 | 7.6 | 6.8 |
| 3 | PET | 6,000 | 7.8 | 6.6 |

The untreated cord was pre-treated by dipping into an adhesive containing 10 grams of polyisocyanate compound (PAPI) made by Kasei Upjohn K.K. and 90 grams of toluene. The pre-treated cord was dried in an oven set at a temperature of 170° to 190° C. for from 10 to 300 seconds. The dried cord was then dipped into an adhesive using an RFL solution as shown in Table 2 below.

TABLE 2

| Formulation of RFL Solution | Parts by weight |
|---|---|
| CR latex | 100 |
| Resorcinol | 14.6 |
| Formalin | 9.2 |
| Sodium hydroxide | 1.5 |
| Water | 262.5 |
| Total | 387.8 |

The cords were then drawn and heat set under the conditions set out in Table 3, below, to produce a treated cord.

TABLE 3

| Sample No. | Polyester Type | Denier (d) | Treating conditions Temperature ° C. | Draw ratio (%) | Strength (g/d) | Dry heat shrinkage stress (g/d) |
|---|---|---|---|---|---|---|
| 1 | PEN | 6,000 | 230 | 1 | 7.3 | 0.43 |
| 2 | PEN | 6,000 | 230 | 2 | 7.3 | 0.53 |
| 3 | PEN | 6,000 | 230 | 3 | 7.4 | 0.61 |
| 4 | PET(1) | 6,600 | 230 | 5 | 7.4 | 0.42 |
| 5 | PET(2) | 6,000 | 230 | 3 | 7.6 | 0.54 |

The inventive V-ribbed belts were produced as follows. One ply of rubber-impregnated canvas was prepared by applying a chloroprene rubber layer to plain weave canvas in which both weft and warp yarns were formed from cotton. The canvas layer was wound on a cylindrical mold. A cushion rubber sheet made of chloroprene rubber as shown in Table No. 4 was wound thereon.

TABLE 4

| Formulation of Rubber | Parts by Weight |
|---|---|
| chloroprene rubber | 100 |
| magnesia | 4 |
| zinc flower | 15 |
| vulcanization accelerator | 2 |
| sulfur | 0.5 |
| antioxidant | 2 |
| carbon black | 65 |
| oil | 8 |

The cord was then wrapped around the cushion rubber layer. A rubber layer formed from the chloroprene rubber composition in Table 4 was wound thereon.

The resulting product was vulcanized at 160° for 30 minutes by conventional methods to produce a cylindrical, vulcanized rubber sleeve.

The rubber sleeve was then mounted around a driving roller and a driven roller and rotated under a predetermined tension. A grinding wheel having 150-mesh diamond on its cutting surface was rotated at 1600 rpm to define ribs. The sleeve was then removed from the rollers and mounted on a cutter assembly, to cut the individual belts from the sleeve as the sleeve was rotated.

The resulting belt had three ribs inside of the cushion rubber layer. The belt was a K-type, 3-rib belt with a length of 1,100 mm according to the RMA standard. The rib pitch was 3.56 mm, with a rib height of 2.9 mm and a rib angle of 40°. The ribs had different thicknesses.

The compression section and the cushion rubber layer were formed using the composition shown in Table 4. The mixture was kneaded with a Banbury mixer and rolled using a calender. The compression section had short fibers extending laterally of the belt. The short fibers were dipped into a treating solution have 10 grams of PAPI (polyisocyanate compound of Kasei Upjohn K.K.) and 90 g of toluene.

The static and dynamic properties of the cord and V-ribbed belt with the cord therein were evaluated. The results are shown in Table 5 below.

TABLE 5

| | Polyester Type | Denier (d) | Dry heat shrinkage stress (N) | 3% Extension Stress (N/rib) | Belt slip ratio (%) | Belt life index |
|---|---|---|---|---|---|---|
| Example 1 | PEN | 6,000 | 118 | 650 | 0.40 | 100 |
| Example 2 | PEN | 6,000 | 126 | 750 | 0.40 | 102 |
| Example 3 | PEN | 6,000 | 132 | 820 | 0.38 | 106 |
| Comparative Example 1 | PET(1) | 6,600 | 135 | 450 | 0.58 | 86 |
| Comparative Example 2 | PET (2) | 6,000 | 148 | 490 | 0.56 | 88 |

The cord and belt were tested by the following methods.

Cord Strength

The strength of the cord was measured using JIS L-1071 (1983).

Dry Heat Shrinkage Ratio of Cord

The dry heat shrinkage ratio of the cord was measured by allowing the cord to stand in an atmosphere of 150° for 30 minutes according to JIS L-1071 (1983).

Dry Heat Shrinkage Stress of Cord

An initial load of 0.25 g/d was applied to the cord. The cord was allowed to reside in an atmosphere of 150° C. for eight minutes. The stress of the cord was measured.

Dry Heat Shrinkage Stress of Belt

The cushion rubber layer having the load carrying cords embedded therein was removed from the belt. The excess cord was removed from both sides of the cushion rubber layer. Five cord samples were prepared. An initial load of 147 N was applied to the samples, with the samples allowed to reside in an atmosphere of 100° C. for 30 minutes. The stress that occurred was measured.

Stress Required to Extend Belt by 3%

The belt was pulled at a rate of 50 mm per minute, and the stress required to extend the belt by 3% measured. The measured value was calculated in terms of a stress for each rib (3.56 mm).

Slip Ratio of Belt

The belt was hung on a triaxial pulley consisting of a driving pulley with a 120 mm diameter, a first driven pulley having a 120 mm diameter, and a second driven pulley having a 45 mm diameter. The larger diameter driven pulley was pulled with a load of 102 kgf to tension the belt. The temperature in the surrounding atmosphere was room temperature. The driving pulley was rotated at 4800 rpm, with the load on the large diameter driven pulley being 12 ps.

The belt was operated using a travelling tester for 400 hours with the belt slip ratio after this travelling test calculated using the following equation.

```
Slip ratio (%) = 100 × (I0 − I400)/I0 wherein:
I0 = NDN.0/NDR.0
I400 = NDN.400/NDR.400
NDR.0:   Number of rotations of a driving pulley at
         the beginning with no load for the test (rpm)
NDN.0:   Number of rotations of a driven pulley at
         startup with no load for the test (rpm)
NDR.400: Number of rotations of a driving pulley
         after 400 hours
NDN/400: Number of rotations of a driven pulley
         after 400 hours
```

Belt Life Index

The travelling test was conducted under the above described conditions. The time elapsed at which cracks developed on the ribs of the belts was measured and indicated in terms of an index in which the value of Example 1 was defined as 100.

Compared to the conventional product, the V-ribbed belt, made according to the present invention, exhibited a relatively low belt slip ratio and was operable for a long period of time before cracks developed.

The foregoing disclosure of specific embodiments is intended to be illustrative of the broad concepts comprehended by the invention.

We claim:

1. A power transmission belt comprising:

a body having a length, an inside, an outside, laterally spaced sides and comprising at least one rib, said body further comprising a compression section, a tension section, and a load carrying element between the inside and outside of the body and extending in a lengthwise direction, said load carrying element comprising twisted polyester fiber filaments comprising ethylene-2,6-naphthalate and having a denier of 4,000 to 8,000, said power transmission belt requiring a stress of at least 500 N/rib to effect elongation of the belt by 3%, said power transmission belt having a dry heat shrinkage stress between 100 N and 200 N after an initial load of 147 N is applied to the power transmission belt and the power transmission belt is allowed to reside in an atmosphere at a temperature of 100° C. for 30 minutes.

2. The power transmission belt according to claim 1 wherein the body comprises a plurality of laterally spaced ribs on one of the inside and outside of the body.

3. The power transmission belt according to claim 2 wherein the body comprises a cushion rubber layer in which the load carrying element is embedded.

4. The power transmission belt according to claim 2 wherein the ribs are defined in the compression section and comprise at least one of hydrogenated nitrile butadiene rubber with a hydrogenation rate of at least 80%, chloroprene rubber, natural rubber, chlorosulfonated polyethylene rubber (CSM), alkylated chlorosulfonated polyethylene rubber (ACSM), and styrene-butadiene rubber (SBR).

5. The power transmission belt according to claim 2 wherein there are reinforcing fibers embedded in the compression section.

6. The power transmission belt according to claim 5 wherein the compression section comprises rubber, the reinforcing fibers comprise at least one of nylon 6, nylon 66, polyester, cotton, and aramid and have a length between 1 and 20 mm and are present in an amount of 1–30 parts by weight per 100 weight parts of rubber.

7. The power transmission belt according to claim 6 wherein the fibers are adhesive treated with at least one of epoxy compound and isocyanate compound.

8. The power transmission belt according to claim 2 wherein the load carrying element comprises a cord and the filaments are upper twisted between 10 and 23 times per 10 cm and lower twisted between 17 and 38 times per 10 cm.

9. The power transmission belt according to claim 2 wherein the ethylene-2,6-naphthalate is formed by polycondensing at least one of naphthalene-2,6-dicarboxylic acid and its ester-forming derivative in the presence of a catalyst.

10. The power transmission belt according to claim 2 wherein the load carrying element is treated with at least one of an epoxy compound and an isocyanate compound.

11. The power transmission belt according to claim 10 wherein after treating the load carrying element with the at least one of an epoxy compound and an isocyanate compound the load carrying element is dried and treated with an RFL solution.

12. The power transmission belt according to claim 11 wherein after treatment with an RFL solution the load carrying element is drawn from 1–3%.

13. The power transmission belt according to claim 2 wherein there is a canvas layer on one of the inside and outside of the body.

* * * * *